US011334829B2

(12) United States Patent
Conaway et al.

(10) Patent No.: US 11,334,829 B2
(45) Date of Patent: May 17, 2022

(54) METHODS AND SYSTEMS FOR ELECTRONIC CHECKLIST DATA REFERENCES

(71) Applicant: Honeywell International Inc., Morris Plains, NJ (US)

(72) Inventors: Cody Ryan Conaway, Phoenix, AZ (US); Steven Curtis Crouch, Mesa, AZ (US); Barbara Holder, Seattle, WA (US)

(73) Assignee: Honeywell International Inc., Charlotte, NC (US)

( * ) Notice: Subject to any disclaimer, the term of this patent is extended or adjusted under 35 U.S.C. 154(b) by 80 days.

(21) Appl. No.: 16/720,430

(22) Filed: Dec. 19, 2019

(65) Prior Publication Data
US 2021/0192411 A1 Jun. 24, 2021

(51) Int. Cl.
*G06F 3/0482* (2013.01)
*G06Q 10/06* (2012.01)
(Continued)

(52) U.S. Cl.
CPC ..... *G06Q 10/06316* (2013.01); *G06F 3/0482* (2013.01); *G06F 16/26* (2019.01); *G06Q 50/30* (2013.01)

(58) Field of Classification Search
CPC ................................................. G06F 3/048–05
See application file for complete search history.

(56) References Cited

U.S. PATENT DOCUMENTS 5,454,074 A    9/1995   Hartel et al.
6,084,553 A *   7/2000   Walls .................... G06F 3/1446
                                                      345/1.3
(Continued)

FOREIGN PATENT DOCUMENTS

CN      101980212 A    2/2011
EP        2490162 A2    8/2012

OTHER PUBLICATIONS

Microsoft, "How to Create a Simple Combo Box", available on May 31, 2018, available at <<https://docs.microsoft.com/en-us/windows/win32/controls/create-a-simple-combo-box>>, 12 pages (Year: 2018).*
(Continued)

*Primary Examiner* — Daniel Rodriguez
(74) *Attorney, Agent, or Firm* — Bookoff McAndrews, PLLC

(57) ABSTRACT

Disclosed are methods, systems, and non-transitory computer-readable medium for electronic checklist data references. For instance, the method may include: displaying, in a GUI, a checklist GUI corresponding to a checklist of an electronic checklist system; determining whether the checklist includes one or more dynamic data references and/or one or more static data references; in response to determining the checklist includes the one or more dynamic data references, performing a dynamic data reference process to display specific data in the checklist GUI for the one more dynamic data references; and in response to determining the checklist includes the one or more static data references, displaying one or more static data fields in the checklist GUI for the one or more static data references to initiate performing a static data reference process for the one or more static data fields.

17 Claims, 15 Drawing Sheets

(51) Int. Cl.
  *G06F 16/26* (2019.01)
  *G06Q 50/30* (2012.01)

(56) References Cited

U.S. PATENT DOCUMENTS

| | | | | |
|---|---|---|---|---|
| 6,115,826 | A * | 9/2000 | Kinkade | G06F 9/4825 713/501 |
| 6,182,283 | B1 * | 1/2001 | Thomson | G06F 9/449 717/153 |
| 6,185,728 | B1 * | 2/2001 | Hejlsberg | G06F 8/34 717/109 |
| 6,219,055 | B1 * | 4/2001 | Bhargava | G06T 17/10 345/420 |
| 6,753,891 | B1 * | 6/2004 | Chohan | G06Q 10/06 715/790 |
| 7,516,061 | B1 * | 4/2009 | Irving | G06F 9/45508 703/23 |
| 8,015,541 | B1 * | 9/2011 | Srinivasan | G06Q 10/107 717/104 |
| 8,736,464 | B1 * | 5/2014 | Downs Mullen | G01C 23/00 340/945 |
| 9,002,571 | B1 * | 4/2015 | Gribble | G06Q 10/0637 701/33.2 |
| 2002/0095457 | A1 * | 7/2002 | Sharma | G06Q 10/087 709/203 |
| 2002/0165647 | A1 * | 11/2002 | Glenn, III | G06F 9/451 701/3 |
| 2004/0015780 | A1 * | 1/2004 | Graupner | G06F 40/205 715/243 |
| 2004/0019774 | A1 * | 1/2004 | Fuchikami | G06F 9/3861 712/244 |
| 2004/0135802 | A1 * | 7/2004 | Allor | G06F 9/453 715/705 |
| 2006/0155726 | A1 * | 7/2006 | Krasun | G06F 16/81 |
| 2006/0161645 | A1 * | 7/2006 | Moriwaki | G06Q 10/06 709/223 |
| 2007/0088467 | A1 * | 4/2007 | H. Knotts | G01C 23/005 701/14 |
| 2009/0108140 | A1 * | 4/2009 | Adams | G06Q 10/06 244/190 |
| 2009/0307431 | A1 * | 12/2009 | Garst, Jr. | G06F 9/4484 711/132 |
| 2012/0117553 | A1 * | 5/2012 | Kielstra | G06F 9/44536 717/163 |
| 2013/0152207 | A1 * | 6/2013 | Cui | G06F 21/566 726/26 |
| 2013/0187926 | A1 * | 7/2013 | Silverstein | G06F 16/80 345/440 |
| 2014/0006943 | A1 * | 1/2014 | Robbins | H04L 67/025 715/273 |
| 2014/0365533 | A1 * | 12/2014 | Debray | G06F 16/24549 707/803 |
| 2015/0081161 | A1 * | 3/2015 | Chapman | G06Q 10/08 701/31.5 |
| 2015/0113466 | A1 * | 4/2015 | Fox | G06F 3/0482 715/773 |
| 2015/0134194 | A1 * | 5/2015 | Beaujard | G07C 5/0808 701/31.7 |
| 2015/0242314 | A1 * | 8/2015 | Hsu | G01C 19/00 702/141 |
| 2015/0298816 | A1 * | 10/2015 | Ouellette | B64D 45/00 701/3 |
| 2016/0180715 | A1 * | 6/2016 | Burke | G08G 5/0013 701/467 |
| 2017/0103210 | A1 * | 4/2017 | Baji-G L | G06F 21/52 |
| 2017/0123772 | A1 * | 5/2017 | Perry | G06F 8/434 |
| 2019/0104106 | A1 * | 4/2019 | Kumar | H04L 61/6022 |
| 2020/0047913 | A1 * | 2/2020 | Shavit | G05D 1/0061 |
| 2020/0090087 | A1 * | 3/2020 | Singh | G06Q 10/06398 |
| 2020/0410162 | A1 * | 12/2020 | Lukkala | G06K 19/06028 |

OTHER PUBLICATIONS

Nanddeep Nachan, "SharePoint Framework—Fetching Data in React", available Nov. 30, 2018, available at <<https://www.c-sharpcorner.com/article/sharepoint-framework-fetching-data-in-react/>>, 7 pages (Year: 2018).*

Extended European Search Report dated May 6, 2021 in counterpart European Patent Application No. 20211686.9 (8 pages, in English).

* cited by examiner

METHODS AND SYSTEMS FOR ELECTRONIC CHECKLIST DATA REFERENCES

TECHNICAL FIELD

Various embodiments of the present disclosure relate generally to methods and system for electronic checklist data references and, more particularly, to methods and system for electronic checklist data references for avionics checklists.

BACKGROUND

Aircraft checklists (and vehicle checklists in general) may contain references to data sources that are not contained in the checklist steps or notes, where the data may be most relevant. For instance, the data may be found somewhere else in the cockpit (or navigation control interface, in general) and the data may be static or dynamic. As an example, the data could be located inside a reference manual, on a quick reference card, in system synoptics, in a trip planning application of a tablet device (e.g., electronic flight bag); therefore, in general, the data may be in any place that is not the checklist itself. This may cause the crew to search for the data outside the checklist. For instance, the process of searching for the data may result in looking across the cockpit at different displays than the one display displaying the checklist, or finding a reference manual that may not be easy to reach. These types of actions may increase crew cognitive and physical workload due to visual switching of attentional resources between separate sources of static and dynamic information. Therefore, there may be a challenge in reducing crew cognitive and physical workload.

Moreover, these types of actions may also increase a potential for error transference during a referencing action. For instance, a crew member may incorrectly remember the data or introduce transcription errors for correctly remembered data. Furthermore, crew interruptions (e.g., ATC requests, flight attendant requests, changes in flight plan, conflicts due to weather, traffic alerts, etc.) may be a normal part of flight operations and these crew interruptions may disrupt procedural awareness, and the disrupted procedural awareness may compound the potential for error. Therefore, there may be another challenge in reducing potential for error transference during a referencing action.

The present disclosure is directed to overcoming one or more of these above-referenced challenges.

SUMMARY OF THE DISCLOSURE

According to certain aspects of the disclosure, systems and methods are disclosed for electronic checklist data references.

For instance, a method may include receiving a user and/or system input at a graphical user interface (GUI) for a checklist of an electronic checklist system of one or more vehicle systems; displaying, in the GUI, a checklist GUI corresponding to the checklist of the electronic checklist system; determining whether the checklist includes one or more dynamic data references and/or one or more static data references; in response to determining the checklist includes the one or more dynamic data references, performing a dynamic data reference process to display specific data in the checklist GUI for the one more dynamic data references; and in response to determining the checklist includes the one or more static data references, displaying one or more static data fields in the checklist GUI for the one or more static data references to initiate performing a static data reference process for the one or more static data fields.

A system may include a memory storing instructions; and a processor executing the instructions to perform a process. The process may include receiving a user and/or system input at a graphical user interface (GUI) for a checklist of an electronic checklist system of one or more vehicle systems; displaying, in the GUI, a checklist GUI corresponding to the checklist of the electronic checklist system; determining whether the checklist includes one or more dynamic data references and/or one or more static data references; in response to determining the checklist includes the one or more dynamic data references, performing a dynamic data reference process to display specific data in the checklist GUI for the one more dynamic data references; and in response to determining the checklist includes the one or more static data references, displaying one or more static data fields in the checklist GUI for the one or more static data references to initiate performing a static data reference process for the one or more static data fields.

A non-transitory computer-readable medium may store instructions that, when executed by a processor, cause the processor to perform a method. The method may include: receiving a user and/or system input at a graphical user interface (GUI) for a checklist of an electronic checklist system of one or more vehicle systems; displaying, in the GUI, a checklist GUI corresponding to the checklist of the electronic checklist system; determining whether the checklist includes one or more dynamic data references and/or one or more static data references; in response to determining the checklist includes the one or more dynamic data references, performing a dynamic data reference process to display specific data in the checklist GUI for the one more dynamic data references; and in response to determining the checklist includes the one or more static data references, displaying one or more static data fields in the checklist GUI for the one or more static data references to initiate performing a static data reference process for the one or more static data fields.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

Figure 7B:
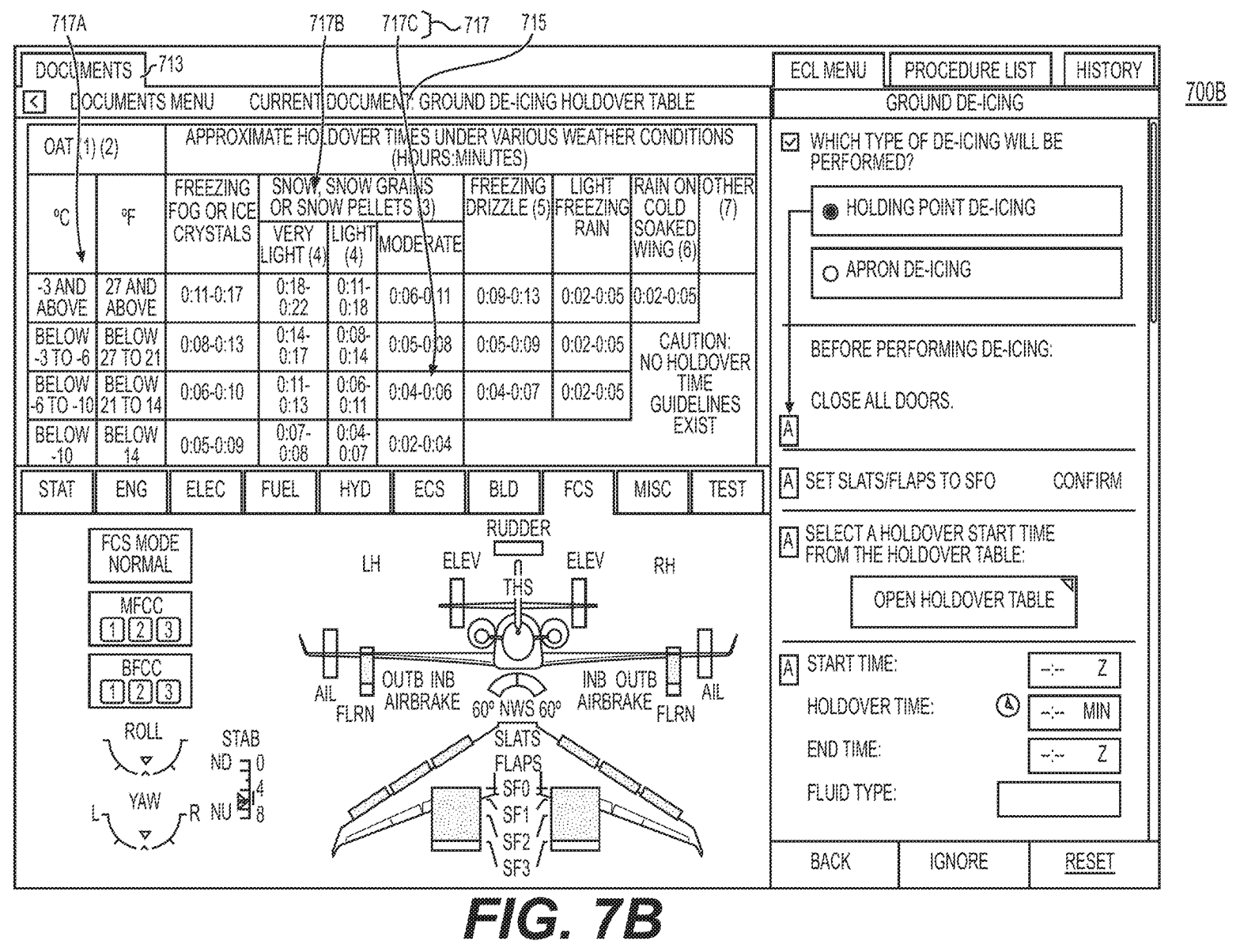
Figure 7D:
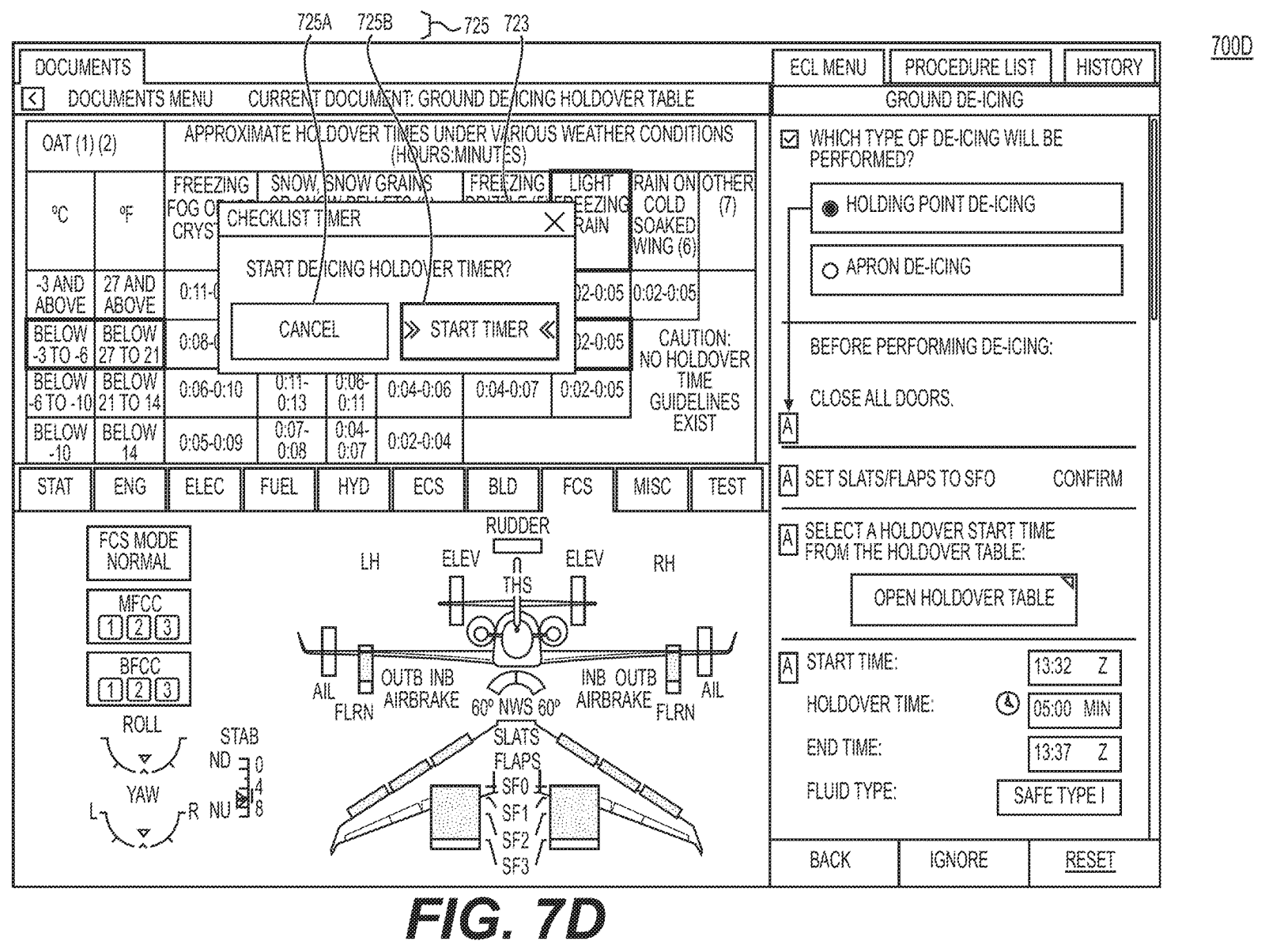
Figure 7E:
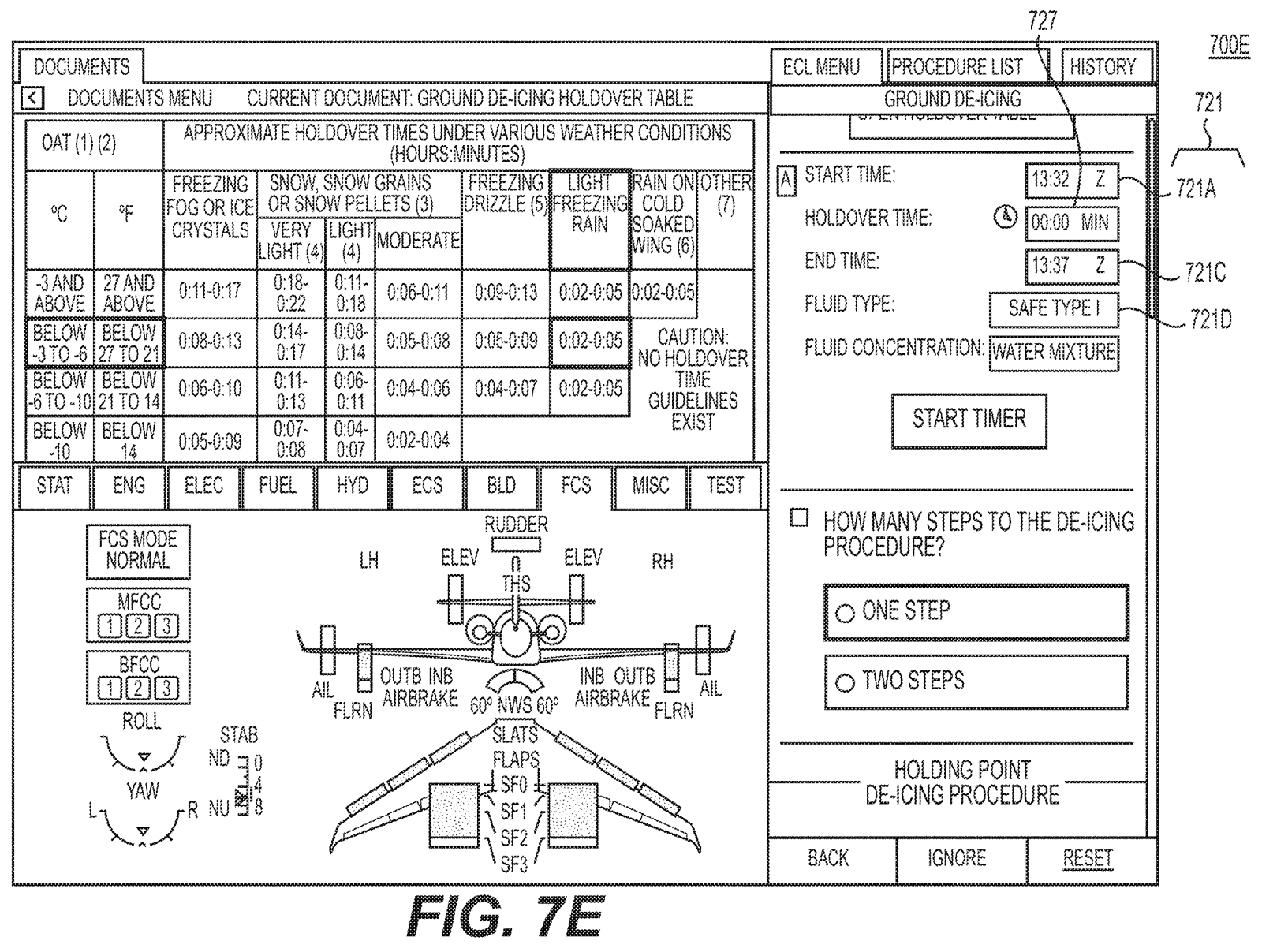

FIGS. 7A-7E depict exemplary GUIs for electronic checklist data references, according to one or more embodiments.

DETAILED DESCRIPTION OF EMBODIMENTS

Various embodiments of the present disclosure relate generally to methods and system for electronic checklist data references.

In general, the present disclosure is directed to methods and system for electronic checklist data references for avionics checklists. For instance, a system of the present disclosure may display dynamic data references and/or static data references in electronic checklists. Dynamic data references may obtain data from outside the checklist and display the data in a position relevant to the checklist tasks. Meanwhile a static data reference may enable a user to view a related reference document and select a value to populate a data field. Therefore, the systems and methods of the present disclosure may reduce the potential for error transference during a referencing action and/or reduce crew cognitive and physical workload. For instance, to reduce the potential for error transference during a referencing action, the systems of the present disclosure may populate values for a user instead of a user remembering/transcribing the value. For instance, to reduce crew cognitive and physical workload, the systems of the present disclosure may display particular data within the checklist itself instead of outside the checklist, so that the user does not have to leave the checklist GUI interface to refer to the particular data.

While this disclosure describes the systems and methods with reference to aircraft, it should be appreciated that the present systems and methods are applicable to checklists of vehicles, including those of drones, automobiles, ships, or any other autonomous and/or Internet-connected vehicle.

Figure 1:
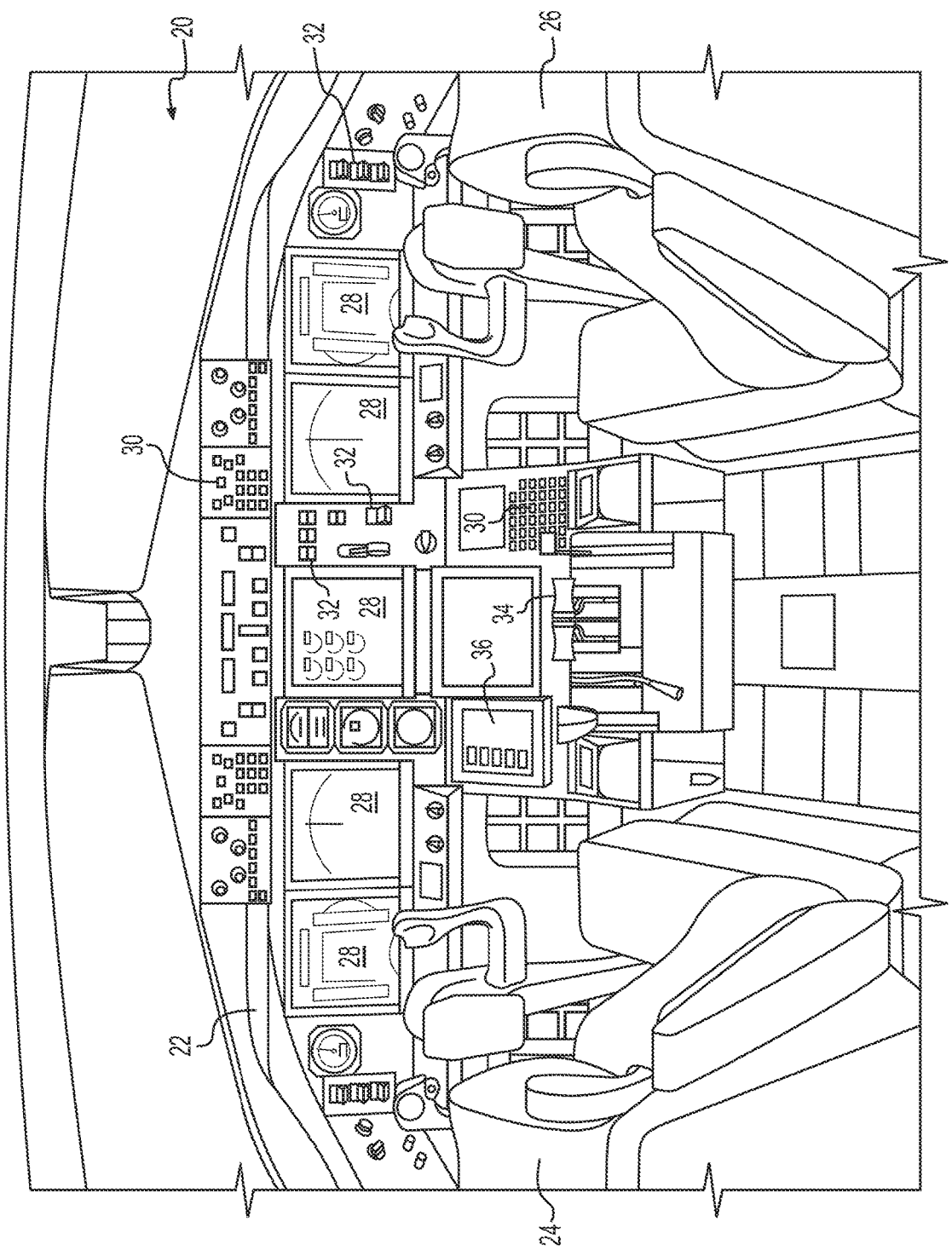
FIG. 1 depicts an exemplary vehicle system environment for displaying electronic vehicle checklists, according to one or more embodiments.

As shown in FIG. 1, an exemplary system environment for an electronic checklist is depicted, according to one or more embodiments. Specifically, FIG. 1 is a fragmentary perspective view illustrating the inside of an exemplary aircraft cockpit 20. Although the context of the following discussion is with respect to GUIs of touch screen displays used in aircraft, it should be understood that the teachings herein pertain to touch screen displays used in any type of vehicle including, but not limited to, land based vehicles such as automobiles and trains as well as watercraft and spacecraft. Additionally, the teachings herein are not limited to vehicle applications. Rather, the teachings herein may also be used together with touch screen displays that are employed in stationary applications such as information kiosks and automatic teller machines as well as with touch screen displays that are hand held or otherwise not mounted to a surface.

Aircraft cockpit 20 includes an instrument panel 22 positioned to be accessible from a pilot seat 24 and a copilot seat 26. Instrument panel 22 includes various front displays 28 and various control features such as buttons 30, switches 32, and throttle controls 34. Also mounted on instrument panel 22 is a control touch screen display 36. Moreover, the front displays 28 may also be touch screen displays.

Figure 2:
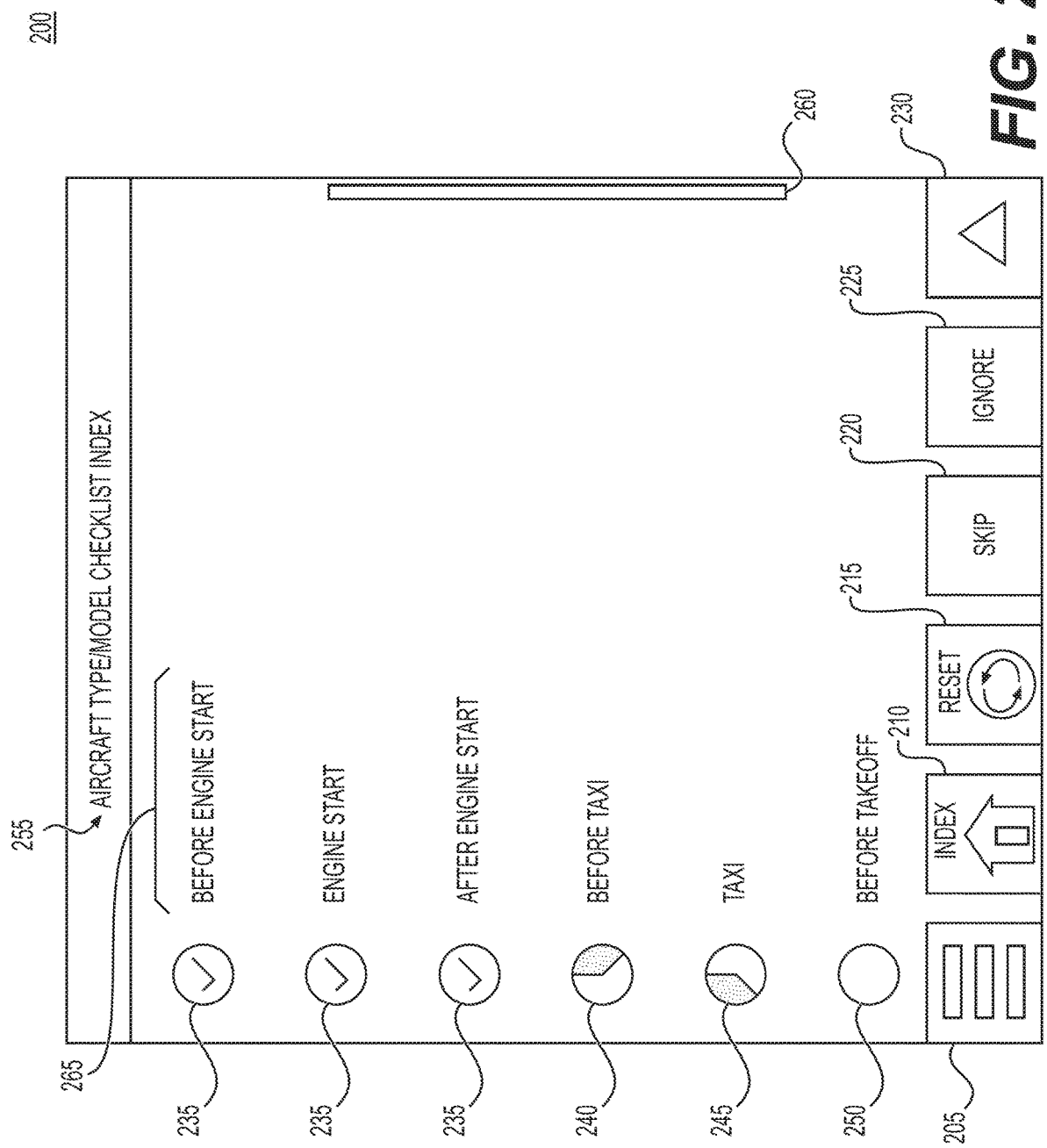
FIGS. 2 and 3 depict GUIs for exemplary electronic checklists, according to one or more embodiments.
Figure 3:
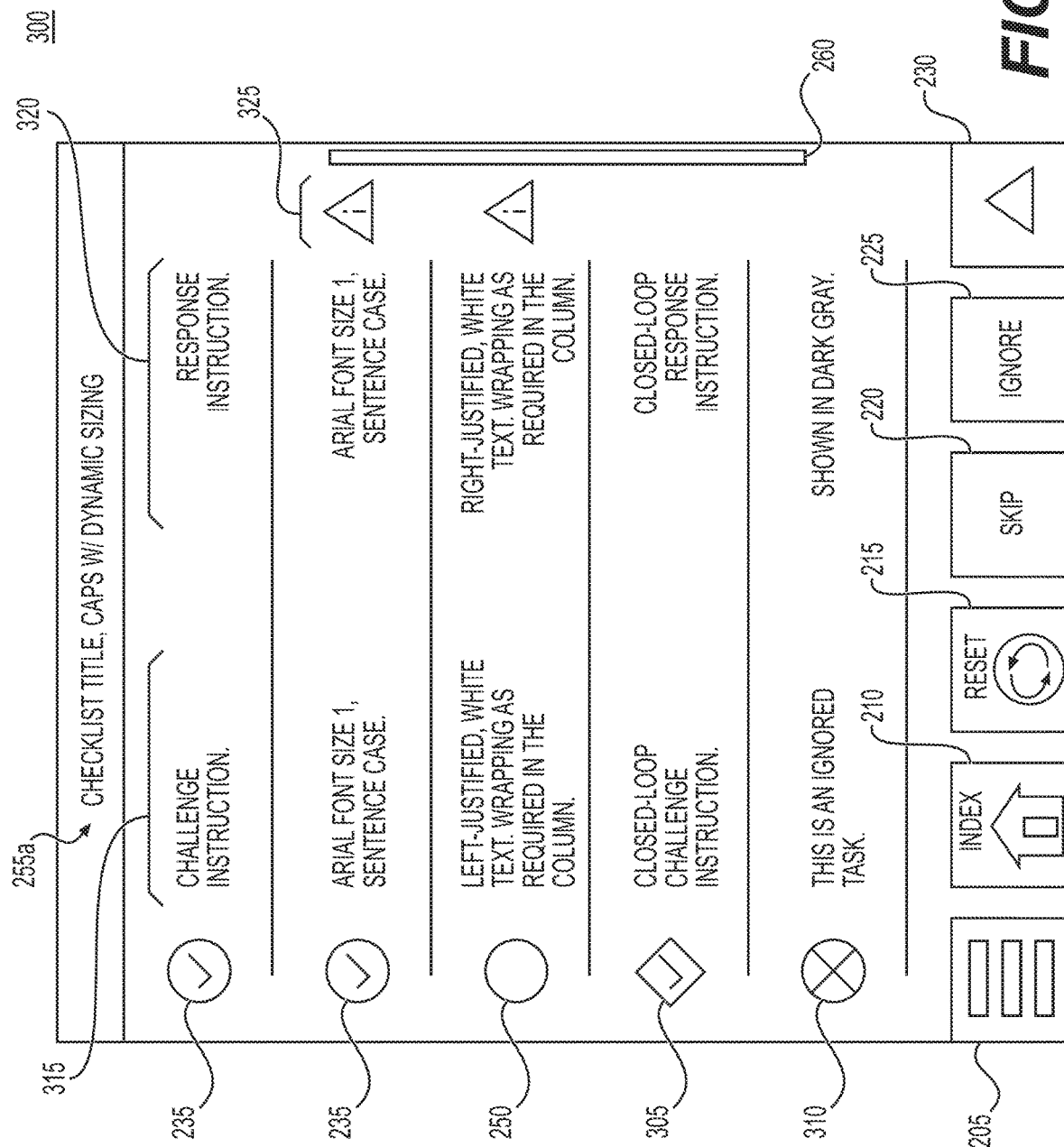

One of the front displays 28 or the control touch screen display 36 (called herein "vehicle manager touch screen") may be configured to operate as a vehicle manager that may display interactive electronic checklists and/or navigation or other vehicle system data. Specifically, a processor may execute a vehicle manager program (comprised of instructions executable by the processor) that causes the vehicle manager touch screen to display a vehicle manager display. For instance, the vehicle manager display may include one or more GUIs as disclosed herein (or variations thereof), such as GUI 200 and GUI 300 (as depicted in FIGS. 2 and 3, respectively).

The processor may cause the vehicle manager touch screen to display the vehicle manager display by generating images and transmitting the images to the vehicle manager touch screen to be displayed. Alternatively, the processor may generate instructions and information and transmit the instructions and information to a graphics processing unit (GPU). The GPU may generate the images to be displayed on the vehicle manager touch screen. The vehicle manager program may be stored in a memory. The memory may be connected to the processor so that the processor may receive stored instructions or data, and the processor may process the instructions, stored data, and received information, in accordance with the vehicle manager program. The memory and the processor may be connected to the vehicle manager touch screen either directly or indirectly. Collectively the memory, the processor, and the vehicle manager touch screen may be referred to as a "vehicle manager system." In one embodiment, the vehicle manager system may be an electronic procedure system of a vehicle.

For instance, the vehicle manager program may control a functionality and configuration of the vehicle manager touch screen, in accordance with a loadable checklist control file (called herein a "loadable database"), e.g., received from a cloud service. The vehicle manager program may store the loadable database in the memory. The vehicle manager program may control the configuration of the vehicle manager touch screen, based on user inputs to the system, data from other vehicle systems, and/or FMS data from, e.g., a cloud FMS. Specifically, the vehicle manager program may display the vehicle manager display to depict an electronic checklist in accordance with the loadable database, and receive user inputs to view and/or to change the configuration of the vehicle manager touch screen.

Generally, user inputs may be a touch interaction with the vehicle manager touch screen (e.g., capacitive, resistive, and/or optical sensing), a user input on a keyboard, a mouse, a scroll wheel, or any other system-defined manner of selecting and interacting with the system. The processor may receive the user inputs and perform specific actions based on the user inputs, in accordance with the vehicle manager program.

FIGS. 2 and 3 depict exemplary GUIs for an electronic checklist, according to one or more embodiments. Specifically, FIGS. 2 and 3 may depict a functionality and configuration of the vehicle manager touch screen, in accordance with a loadable database received from a cloud service.

In FIG. 2, GUI 200 may include a group of home icons (including one or more of a system function menu icon 205, an index icon 210, a reset icon 215, a skip icon 220, an ignore icon 225, a display control drop down menu icon 230), one or more completed task indicators 235, one or more partially completed task indicators 240 and 245, one or more incomplete task indicators 250, a header 255, a scroll bar indicator 260, and one or more task titles 265. A processor, as described above, may cause GUI 200 to be displayed on the vehicle manager touch screen of the system. The GUI 200 may be a home menu for a vehicle manager system. One or more tasks (a task may be an indicator associated with a task title) may represent a sub-checklist. A user may select the task, and the sub-check list corresponding to the selected task may be displayed; for instance, FIG. 3 may depict an example of a sub-check list that is displayed in GUI 300. In each checklist (parent checklist), any task may represent a sub-checklist of the parent checklist (e.g., a sub-check list to a sub-checklist is a grandchild to the home menu).

In FIG. 3, the GUI 300 may include the same features as the GUI 200, however it may also be different, and it may include a different header 255a, one or more system completed task indicators 305, one or more ignored task indicators 310, one or more challenge instructions 315, one or more response instructions 320, and one or more additional information indicators 325. Specifically, as mentioned above, when a user selects a task with a sub-checklist, the processor may update the display to display the sub-checklist. The different header 255a may correspond to the task title 265 associated with the selected task (or a sub-checklist name if different than the task title 265). The one or more challenge instructions 315 and the one or more response instructions 320 may each be associated with an indicator. The one or more challenge instructions 315 may contain text associated with the task the user is to focus attention on. The one or more response instructions 320 may contain text associated with the task the crew is to the focus on. The one or more additional information indicators 325 may be checklist impact notifications (CINs). The one or more additional information indicators 325 may be associated with tasks that have additional information related to notes, cautions, and warnings. CINs may provide access to notes, cautions, and warnings for individual tasks by a message popup.

Figure 4:
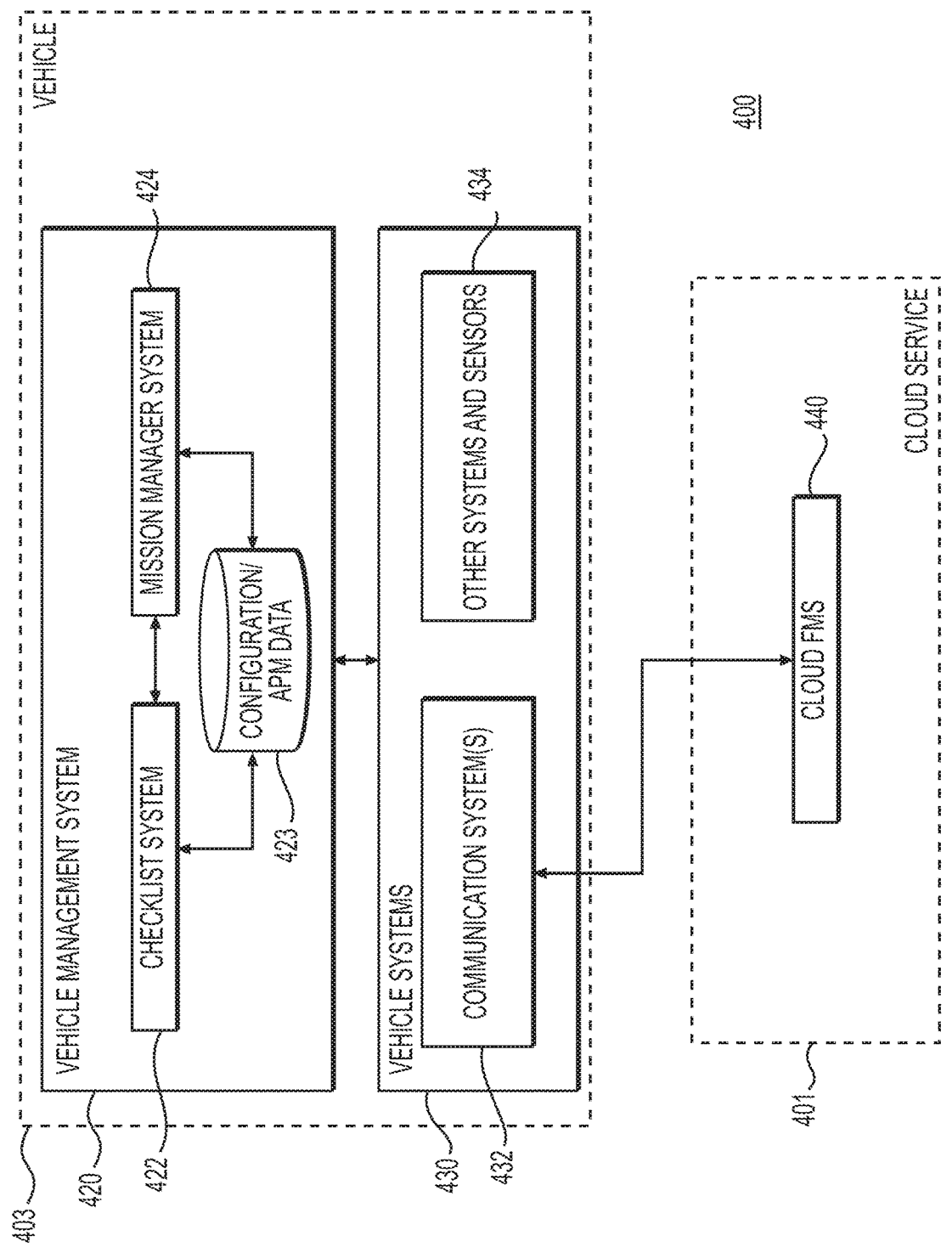
FIG. 4 depicts an exemplary block diagram of a system for electronic checklist data references, according to one or more embodiments.

FIG. 4 depicts an exemplary block diagram of a system 400 for electronic checklist data references, according to one or more embodiments. The system 400 may include a cloud service 401 and/or a vehicle 403. The cloud service 401 and the vehicle 403 may communicate over a network using, e.g., a TCP/IP communication infrastructure, or the cloud service 401 and the vehicle 403 may communicate over the network and/or satellite communications infrastructure, etc.

The cloud service 401 may include a cloud flight management system (FMS) 440 and/or other software as a service (SaaS) systems. The cloud FMS 440 may be a cloud-based platform that provides FMS services to any user who has authorized access to the cloud FMS 440. Specifically, the cloud FMS 440 may provide FMS micro-services. The FMS micro-services may be FMS services organized as a collection of specialized modular services. In some implementations, the FMS micro-services may be software applications stored, at least in part, in one or more servers remote from the vehicle 403, for cloud-based access from the vehicle 403. The FMS micro-services may be modular services which are developed, deployed, and scaled independently of each other, messaging-enabled to communicate with various components within the cloud FMS 440, and organized around capabilities. The FMS micro-services may include, for example, flight planning services, in-flight navigation services, airport specific services, ground communication services, weather services, services for computing fuel scenarios, services for computing optimization scenarios, services for offsetting deviations, and services for computing approach procedures. The FMS micro-services may be implemented as hardware, software, and/or a combination of hardware and software.

The vehicle 403 may include a vehicle management system 420 and vehicle systems 430. In one embodiment, the vehicle management system 420 may be an electronic procedure system of a vehicle. The vehicle management system 420 may include a checklist system 422, a mission manager system 424, and/or a configuration memory 423 storing configuration data and/or aircraft profile management (APM) data. The configuration data may include configuration rules that generally apply to checklists and/or display of information. The APM data may include additional configuration rules specific to different aircraft defined by original equipment manufacturers (OEM). The vehicle systems 430 may include one or more communications system(s) 432 and other systems and sensors 434.

The one or more communications system(s) 432 may include one or more of a cellular communications system, a Wi-Fi system, a radio communications system, a satellite communications system, etc. The one or more communications system(s) 432 may receive and transmit messages to/from the vehicle 403 from/to the cloud 401 (e.g., the cloud FMS 440). The one or more communications system(s) 432 may also communicate with the vehicle management system 420. For instance, the one or more communications system(s) 432 may receive FMS data from the cloud FMS 440, and transmit the FMS data to the vehicle management system 420.

The other systems and sensors 434 may include one or more of navigation systems (e.g., GPS systems), engine systems, actuation systems, control systems, temperature systems, life systems, external sensors (e.g., weather radar, temperature, pressure, density, velocity sensors) or internal sensors (e.g., cabin pressure sensor), etc. of the vehicle 403. The other systems and sensors 434 may communicate with the vehicle management system 420. For instance, the other systems and sensors 434 may transmit vehicle systems data to the vehicle management system 420.

The checklist system 422 may communicate with the configuration memory 423, the mission manager system 424, and/or the other systems and sensors 434. The checklist system 422 may receive a loadable database from a checklist designer system hosted by, e.g., the cloud FMS 440. The checklist system 422 may also receive messages from the mission manager system 424; the configuration/APM data from the configuration memory 423; and the vehicle systems data of the other systems and sensors 434. The checklist system 422 may output checklists GUIs and/or information for checklist GUIs to the mission manager system 424, for displaying checklist GUIs by the mission manager system 424, in accordance with the loadable database, the messages, the configuration/APM data, and the vehicle systems data.

For instance, the checklist system 422 may extract one or more data structure(s) and one or more function(s) from the loadable database; extract rulebook rules from a rulebook (e.g., included in the loadable database); extract data from databases of the vehicle 403; extract configuration rules from the configuration/APM data; extract sensor data and/or synoptic data from vehicle systems data; extract notifications from the messages from the mission manager system 424 (e.g., a selection based on user inputs or a crew alerting system (CAS) message); and extract phase of flight information from messages from the mission manager system 424 (collectively, "checklist inputs"). The checklist system 422 may validate the checklist inputs, e.g., to ensure correct source(s), correct format, etc.

As discussed above, the loadable database may include the one or more function(s) and the one or more data structure(s) for generation and control of the checklist GUIs. Specifically, a data structure may include content and arrangement information. The content may be displayed in a checklist GUI in accordance with arrangement information. The configuration rules of the configuration/APM data may include display rules for how the content is to be displayed in accordance with the arrangement information. A function may include program code for how system and/or user inputs are to update the checklist GUI (e.g., as outputs).

For instance, the one or more data structure(s) may include information about minimum equipment lists (MELs), master MELs (MMELs), aircraft flight manuals (AFMs), configuration deviation lists (CDLs), etc. The program code of the one or more function(s) may control checklist GUIs and data based on events. Events may be based phase of flight, CAS messages, flight plan data, flight data, synoptics, and/or pilot action(s). For example, a function may start based on a phase of flight event (e.g., transition between takeoff and cruise), and the function may generate and display a first checklist GUI corresponding to one or more tasks for the transition from takeoff to cruise. As another example, a function may start based on an emergency event (e.g., information indicating a sensor detecting smoke, which may be included in the vehicle systems data), and generate and display a second checklist GUI corresponding to one or more tasks for resolving the emergency event. As discussed above, the checklist GUIs may be based on the one or more data structure(s), the configuration/APM data, and/or the one or more function(s).

The mission manager system 424 may communicate with the checklist system 422, the configuration memory 423, the other systems and sensors 434, and the cloud FMS 440 (via, e.g., the one or more communications systems 432). The mission manager system 424 may receive messages from the checklist system 422 (e.g., information/instructions/graphics for displaying the checklist GUI); the configuration/APM data from the configuration memory 423; the vehicle systems data of the other systems and sensors 434; and/or the FMS data from the cloud FMS 440.

The mission manager system 424 may manage MEL data, manage flight plan buffer and/or display, and/or manage checklist display and interactions from a user, such as a crew of an aircraft. Specifically, the mission manager system 424 may display one or more of the checklist GUIs, and receive and process user inputs. For instance, the mission manager system 424 may render GUIs for managing phase of flight based checklists, GUIs for managing CAS/emergency checklists, and/or GUIs for aircraft configurations, and manage crew selections with respect to the rendered GUIs. For instance, the mission manager may render the GUIs, as based on the messages from the checklist system 422; the configuration/APM data from the configuration memory 423; the vehicle systems data of the other systems and sensors 434; and/or the FMS data from the cloud FMS 440.

In one aspect of the disclosure the checklist system 422 may perform a data reference process, in accordance with the loadable database. The data reference process may include: receiving a user and/or system input at a graphical user interface (GUI) for a checklist of an electronic checklist system of one or more vehicle systems; displaying, in the GUI, a checklist GUI corresponding to the checklist of the electronic checklist system; determining whether the checklist includes one or more dynamic data references and/or one or more static data references; in response to determining the checklist includes the one or more dynamic data references, performing a dynamic data reference process to display specific data in the checklist GUI for the one more dynamic data references; and in response to determining the checklist includes the one or more static data references, displaying one or more static data fields in the checklist GUI for the one or more static data references to initiate performing a static data reference process for the one or more static data fields.

To receive a user and/or system input at the GUI for the checklist of the electronic checklist system of one or more vehicle systems, the mission manager system 424 may: receiving a user input on the vehicle manager touch screen selecting a checklist and/or a system input to the mission manager system 424 selecting the checklist. For instance, a user may select a task by a touch input of the one or more partially completed task indicators 240 of FIG. 2 to display a corresponding sub-checklist (e.g., a "Before Takeoff" sub-checklist). Additionally or alternatively, a system input, such as a CAS message or emergency condition, may trigger a selection of corresponding checklist for the CAS message or the emergency condition. The mission manager system 424 may then transmit the selection of the checklist to the checklist system 422.

To be displayed in the GUI, the checklist GUI corresponding to the checklist of the electronic checklist system may include: receiving, by the checklist system 422, the selection of the checklist; extracting, by the checklist system 422, relevant data for the checklist; and transmitting, by the checklist system 422 to the mission manager system 424, the relevant data so that the mission manager system 424 may display the checklist GUI on the vehicle manager touch screen. The mission manager system 424 may then display the checklist GUI on the vehicle manager touch screen. One of skill in the art would recognize that the mission manager system 424 and the checklist system 422 may be physically separate systems, logically separate software programs on a same system, or portions of a software program of the vehicle management system 420.

The extracting, by the checklist system 422, the relevant data for the checklist may include: obtaining checklist function(s) (if any) and checklist data structure(s) from the one or more function(s) and the one or more data structure(s) from the loadable database. For instance, the selected checklist may be indicated by an identifier, and the checklist function(s) (if any) and checklist data structure(s) may be associated with the identifier. The checklist system 422 may find the checklist function(s) (if any) and checklist data structure(s) by the association with the identifier.

The checklist function(s) may include program code for how the checklist system 422 is to manage (e.g., update) the checklist GUI based on user inputs and/or system inputs. For instance, at a minimum, a main checklist function may be associated with each checklist to track a state of the checklist as user inputs/system inputs indicate completion of tasks, timers, other system states, etc., and how the completion of tasks, timers, other system, states are to be displayed, in accordance with content and arrangement information of the checklist data structure(s). In general, the checklist function(s) for the checklist may or may not include a data reference function. The data reference function may include program code to execute a dynamic data reference process and/or a static data reference process for each dynamic data reference and/or static data reference of a checklist. The data reference function may be executed by the checklist system 422 or the mission manager system 424.

To determine whether the checklist includes the one or more dynamic data references and/or the one or more static data references, the data reference function may: determine whether the content of the checklist data structure(s) includes one or more data reference tags; in response to determining the content of the checklist data structure(s) includes the one or more data reference tags, for each data reference tag, determine a type of the data reference tag (e.g., dynamic type or static type); in response to determining the type of each data reference tag, determine the checklist includes the one or more dynamic data references and/or the one or more static data references.

The data reference tags may be elements of content for specific checklist tasks. For instance, as discussed in further detail in FIGS. 6A-6C and FIGS. 7A-7E, the elements of content for the data reference tags of the content for various checklist tasks may indicate to the data reference function to execute a specific process (e.g., dynamic data reference process and/or a static data reference process). Each data reference tag may include a one or more display contents, a type (static or dynamic, which controls a type of functionality of the data reference function), one or more pointers corresponding to the one or more display contents (e.g., to a resource outside the checklist system 422/mission manager system 424), and/or fetch data/linked function pointer. As a specific example, the checklist data structure(s) may be XML code, and the data reference tag may be an element of a checklist task portion of the XML code. The element may include display content, a type attribute, a pointer content, and/or a fetch data content/linked function pointer. The display content may include text to be displayed that is dynamic and/or static, such as "<ref> psi" where "<ref>" is dynamic and is to be updated and "psi" is static. The type attribute may indicate static or dynamic. The pointer content is an indicator/link to where "<ref>" is to be obtained (e.g., from outside the checklist system 422). For dynamic data reference tags, the element may include the fetch data content, which may be an indicator (e.g., at launch) or a rate (e.g., every set period of time), and a linked function pointer, which may indicate an associated function, if any, to be invoked; for static data reference tags, the element may include the linked function pointer, which may indicate an associated function, if any, to be invoked.

Generally, the pointer(s) (or the pointer content of the XML example above) may be indicators of specific aircraft system bits of information or links to specific locations for the specific aircraft system bits of information. Examples of aircraft system bits of information may include static references and real-time references. Static references may include reference manuals, a quick reference card, PDFs, documents, etc. Real-time references may include system synoptics, EFS data, etc., such as: (1) CAS messages; (2) environmental control system (ECS) data, such as pressurization data, cabin altitude data, aircraft altitude data, oxygen data, cabin temperature data, ECS deltas data, vent statuses; (3) performance data and air data system information, such as engine(s) data, fuel data, weight data, boost pump and valve statuses, etc.; (4) hydraulics, flight controls, and configuration devices statuses/data, such as parking and speed brakes statuses/data, doors statuses/data, gear statuses/data, slats statuses/data, and flaps statuses/data; (5) electrical & accessory data, such as statuses of batteries and generators, status of emergency locator transmitters (ELT), status of ram air turbine (RAT), status of auxiliary power units (APUs), and statuses of interior and exterior lights; (6) aircraft capabilities and limitations data, such as speed data, altitude data, maneuvering limitations data, approach minimums data, etc.; (7) computer network data, such as on-board computer network data, such as from a connected device (e.g., an EFB), and/or off-board network data, such as the FMS data, etc.; (8) Icing protection data, such as wing anti-ice data, cowl anti-ice data, windshield heat data, leading edge boots data; and/or (9) aircraft location status: aircraft on ground status and/or weight on wheel status.

Generally, the data reference function may be passed the data reference tags, and perform the dynamic data reference process for each dynamic data reference tag and/or display one or more static data fields in the checklist GUI for the one or more static data references to initiate performing a static data reference process for the one or more static data fields. Specifically, the data reference function may, for each data reference tag, obtain a type of the data reference tag; determine whether the type is a dynamic type or a static type; in response to determining the type is a dynamic type, execute a dynamic data reference process for that data reference tag; and in response to determining the type is a static type, display a static data fields in the checklist GUI for the static data reference to initiate performing a static data reference process for the static data field.

To perform the dynamic data reference process to display specific data in the checklist GUI for the one more dynamic data references, the data reference function may (for each dynamic data reference tag): obtain a pointer and/or a fetch data from a data reference tag; obtain particular data based on the pointer; display the particular data in accordance with the display content; determine whether the fetch data indicates at launch (e.g., 1 time) or a rate; in response to determining the fetch data indicates at launch, end the process; and in response to determining the fetch data is a rate, obtain the particular data every set period of time in accordance with the rate. To obtain particular data based on the pointer, the data reference function may (1) filter received data (e.g., received by the mission manager system 424 or the checklist system 422) to obtain a corresponding aircraft system bit of information, and/or (2) transmit a request to a system component of the other systems and sensors 434 and receive a response from the system component that includes the corresponding aircraft system bit of information. As one of skill in the art would recognize, the dynamic data reference process is dynamic because the checklist may not contain the particular data to be displayed until the data reference function obtains the particular data and displays the particular data. In this manner, the methods and systems of the present disclosure may reference data outside the checklist system 422 or the mission manager system 424, in accordance with the pointer and the fetch data. Moreover, in the case the fetch data is a rate, the dynamic process may continuously update the particular data so that a user is informed of changes in the particular data.

To display the one or more static data fields in the checklist GUI for the one or more static data references to initiate performing a static data reference process for the one or more static data fields, the data reference function may: obtain the display content (which may dictate the content and arrangement of the static data fields); and display the display content in the checklist GUI, until a user input/system input selects the static data fields to initiate performing a static data reference process. To perform the static data reference process, the data reference function may (for each static data reference tag): wait for a user input/system input on a static data field; in response to the user input/system input selecting the static data field, launch a viewer based on a pointer of a corresponding static data reference tag; in response to user input(s) on the viewer, populate the static data field with a value; and invoke an associated function, if any, based on a linked function pointer (of the checklist function(s)) using the value. A user input selecting the static data field may be a touch, click, etc. on an associated task of the static data field or on the static data field itself. A system input selecting the static data field, may be a user input/ system input indicating a task preceding (e.g., immediately preceding) the task associated with the static data field is complete.

To launch the viewer based on the pointer of the corresponding static data reference tag, the data reference function may: access a corresponding data reference (e.g., reference manuals, a quick reference card, PDFs, documents) using the pointer; and display a portion of the data reference (e.g., by opening the data reference to a page, section, chart, etc., in accordance with the pointer). The data reference function may then select a value based on user inputs (e.g., as discussed below with respect FIGS. 7A-7E). In response to user input(s) on the viewer, the data reference function may then populate the static data field with the value. In response to the value being populated, the data reference function may then invoke the associated function, if any, based on a linked function pointer by passing the value in a call to the associated function. In this manner, the methods and systems of the present disclosure may reference data outside the checklist system 422 or the mission manager system 424, in accordance with the pointer, and invoke an associated function, in accordance with the linked function pointer.

Therefore, the systems and methods of the present disclosure may reduce the potential for error transference during a referencing action and/or reduce crew cognitive and physical workload. For instance, to reduce the potential for error transference during a referencing action, the systems of the present disclosure may populate values for a user instead of a user remembering/transcribing the value. For instance, to reduce crew cognitive and physical workload, the systems of the present disclosure may display particular data within the checklist itself instead of outside the checklist, so that the user does not have to leave the checklist GUI interface to refer to the particular data.

As an example, a crew may be required to manually control cabin pressure and altitude during a rapid depressurization event. Using the systems of the present disclosure, the data reference function may display real-time ECS data in a related ECS checklist that is presented with the checklist step to manually control cabin altitude and then remind the crew to continually monitor and change the setting. This may lower crew workload during high-stress conditions where there is high potential for the crew to forget what the setting is and to take action on the instruction.

Figure 5:
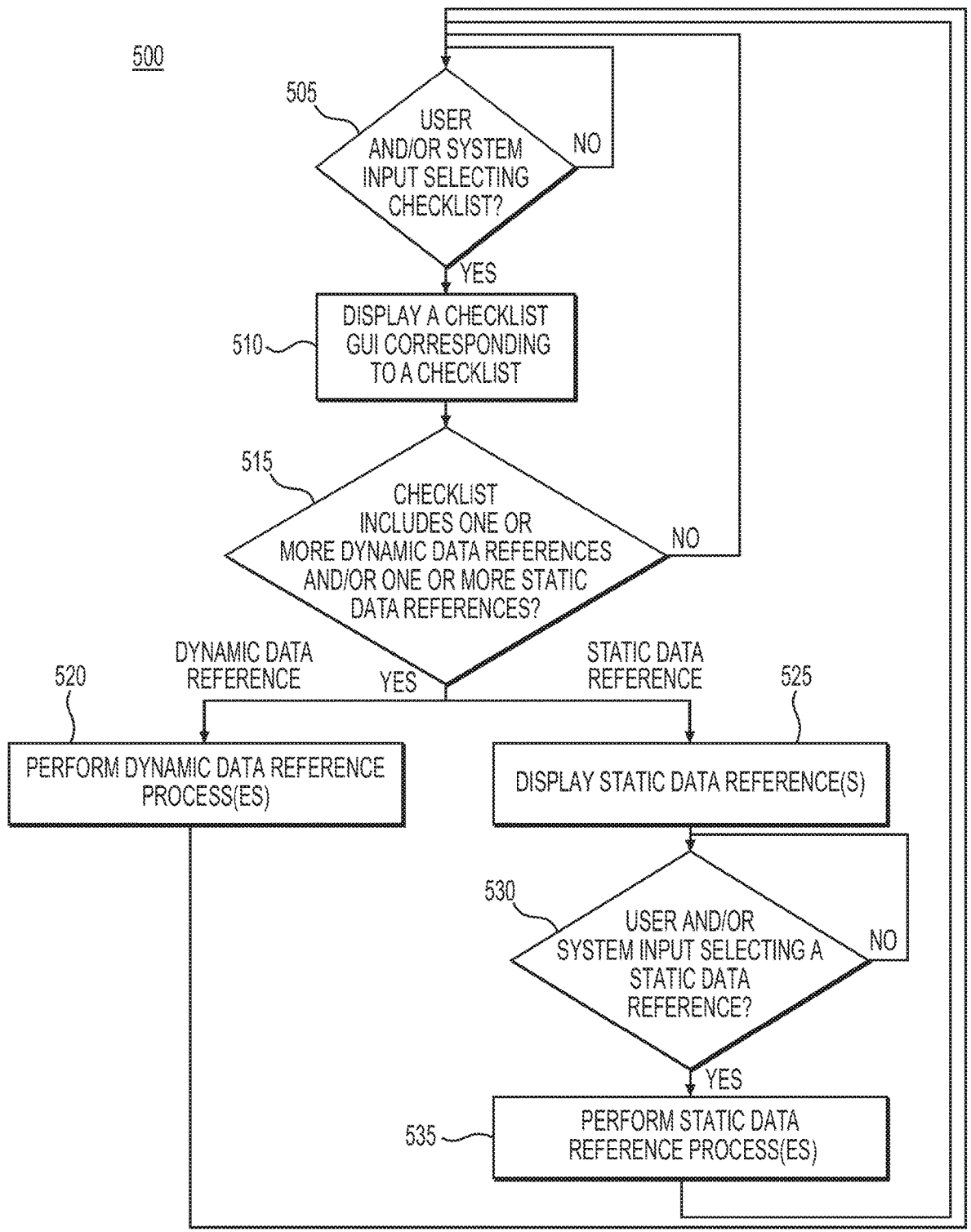
FIG. 5 depicts a flowchart for a method for electronic checklist data references, according to one or more embodiments.

FIG. 5 depicts a flowchart 500 for a method for electronic checklist data references, according to one or more embodiments. The flowchart 500 may be performed by the checklist system 422 and the mission manager 424, as discussed above, and whichever of the checklist system 422 and the mission manager 424 is executing the data reference function. The mission manager system 424 may start the process of the flowchart 500 by determining whether user input/system input selects a checklist (block 505). For instance, the mission manager system 424 may determine whether a user input selects a task to open a sub-checklist, as discussed above with respect to FIG. 4.

In response to determining that no user input/system input selects a checklist (block 505: No), the mission manager system 424 may proceed to wait until the user input/system input selects a checklist (block 505). In response to determining that user input/system input selects a checklist (block 505: Yes), the mission manager system 424 may transmit a message to the checklist system 424 indicating the selected checklist, and receive data back to display a checklist GUI corresponding to the checklist (block 510).

Next, the data reference function may determine whether the checklist includes the one or more dynamic data references and/or the one or more static data references (block 515). For instance, the data reference function may determine whether there are one or more dynamic data reference tags and/or one or more static data reference tags, as discussed above.

In response to determining that the checklist does not include the one or more dynamic data references and/or the one or more static data references (block 515: No), the data reference function may then exit and return to wait for a user input/system input selecting another checklist (block 505). In response to determining that the checklist does include the one or more dynamic data references and/or the one or more static data references (block 515: Yes): (1) for each dynamic data reference, the data reference function may then perform a dynamic data reference process (block 520); and (2) for each static data reference, the data reference function may display a static data reference (e.g., a static data field) (block 525).

For instance, for the dynamic data references, the data reference function may obtain particular data and display the particular data in accordance with the pointer and fetch data of the dynamic data references, as discussed above. After the checklist is complete (or the fetch data indicates retrieval of particular data once, e.g., only at launch), the data reference function may then exit and return to wait for a user input/ system input selecting another checklist (block 505).

In the case static data references are displayed, the data reference function may continue to determine whether a user input/system input selects a static data reference (e.g., a static data field) (block 530). In response to determining that no user input/system input selects a static data reference (bock 530: No), the data reference function may wait until user input/system input selects a static data reference (block 530). In response to determining that a user input/system input selects a static data reference (bock 530: Yes), the data reference function may then perform a static data reference process (block 530). For instance, the data reference function may, based on user input(s) on a viewer of a data reference displayed based on a pointer of the static data reference, populate the static data field with a value; and invoke an associated function, if any, based on a linked function pointer, as discussed above with respect to FIG. 4. After the checklist is complete (or associated functions have run), the data reference function may exit and return to wait for a user input/system input selecting another checklist (block 505).

Figure 6A:
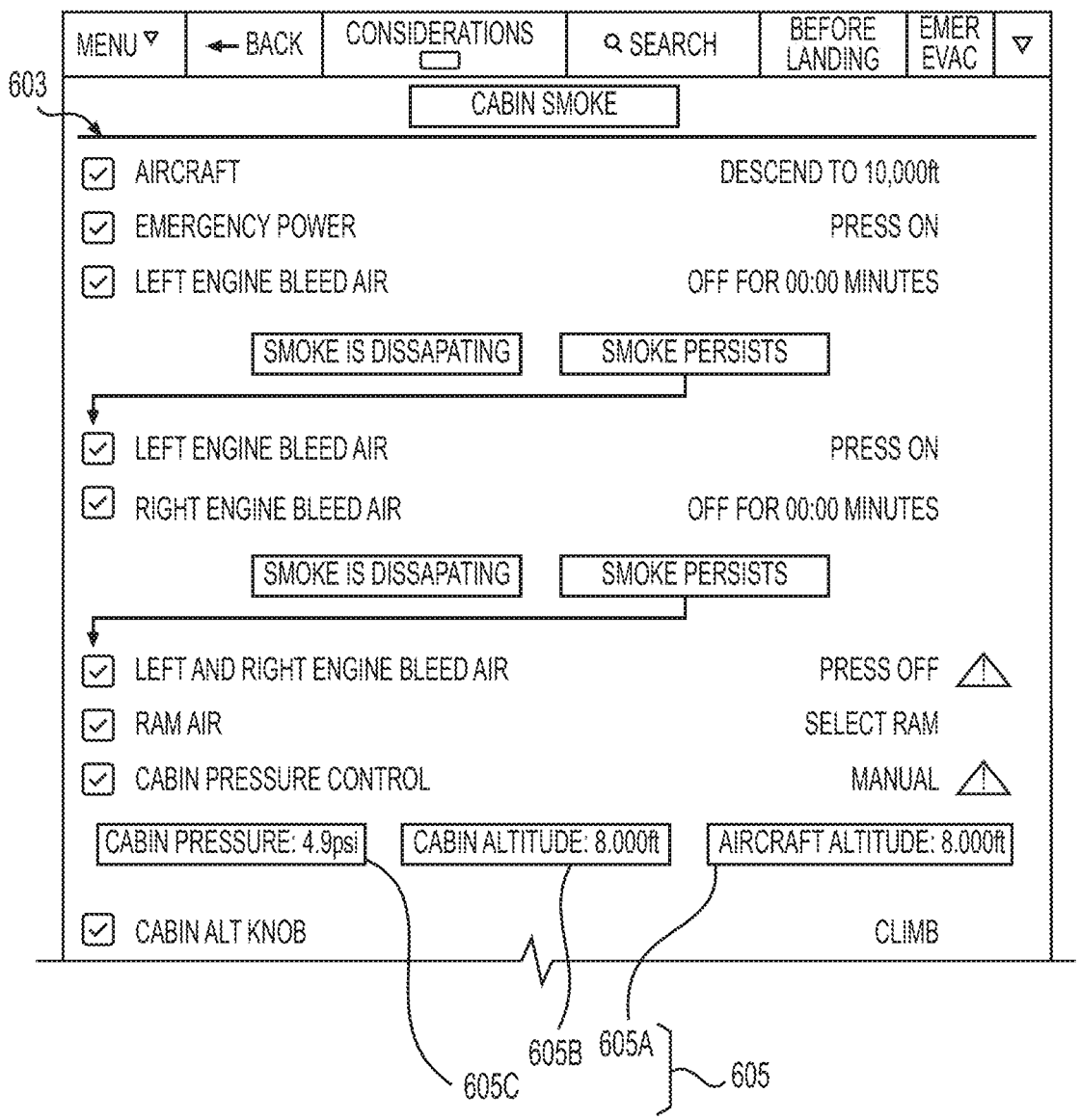
FIGS. 6A-6C depict exemplary GUIs for electronic checklist data references, according to one or more embodiments.
Figure 6A:
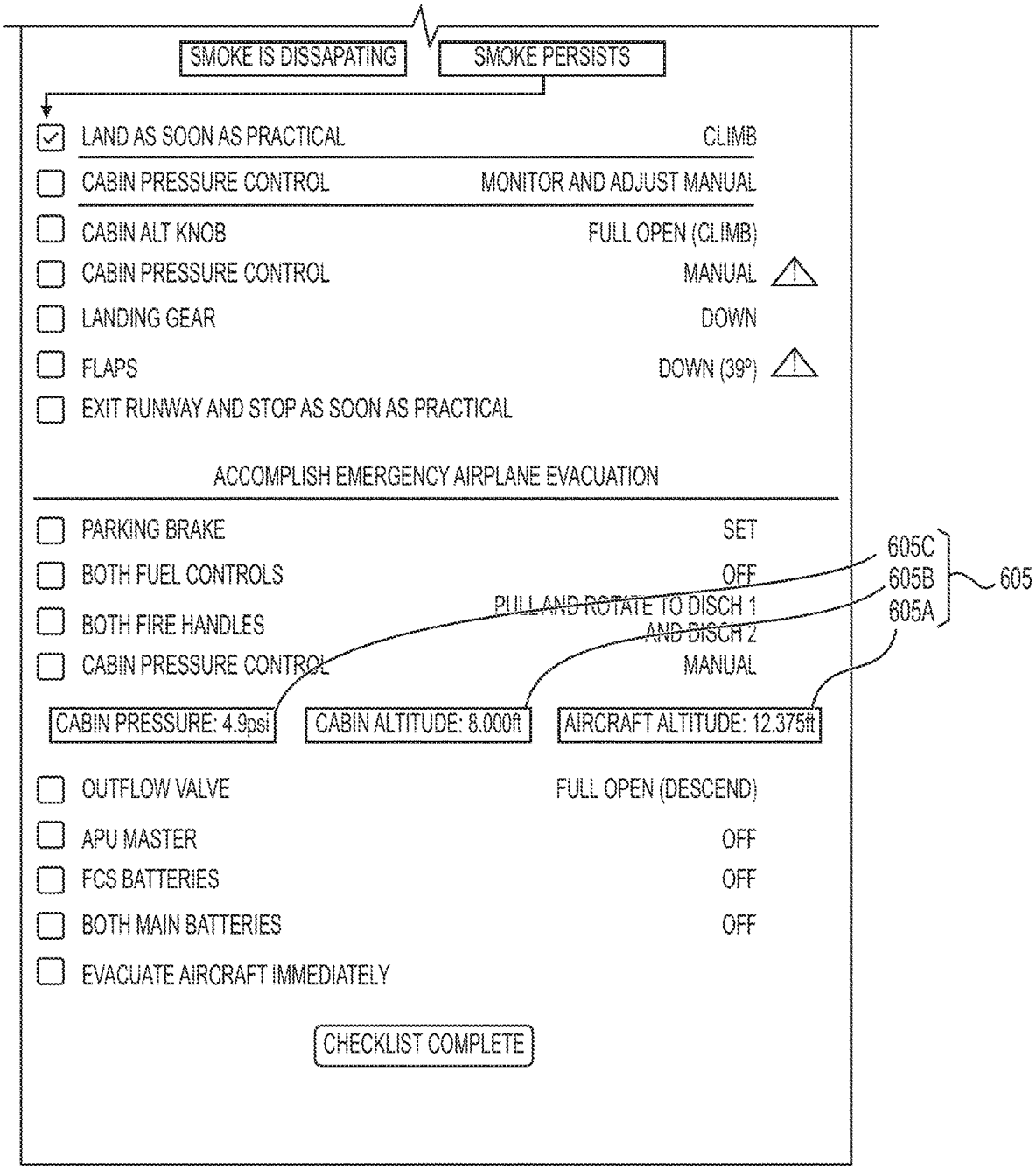
Figure 6B:
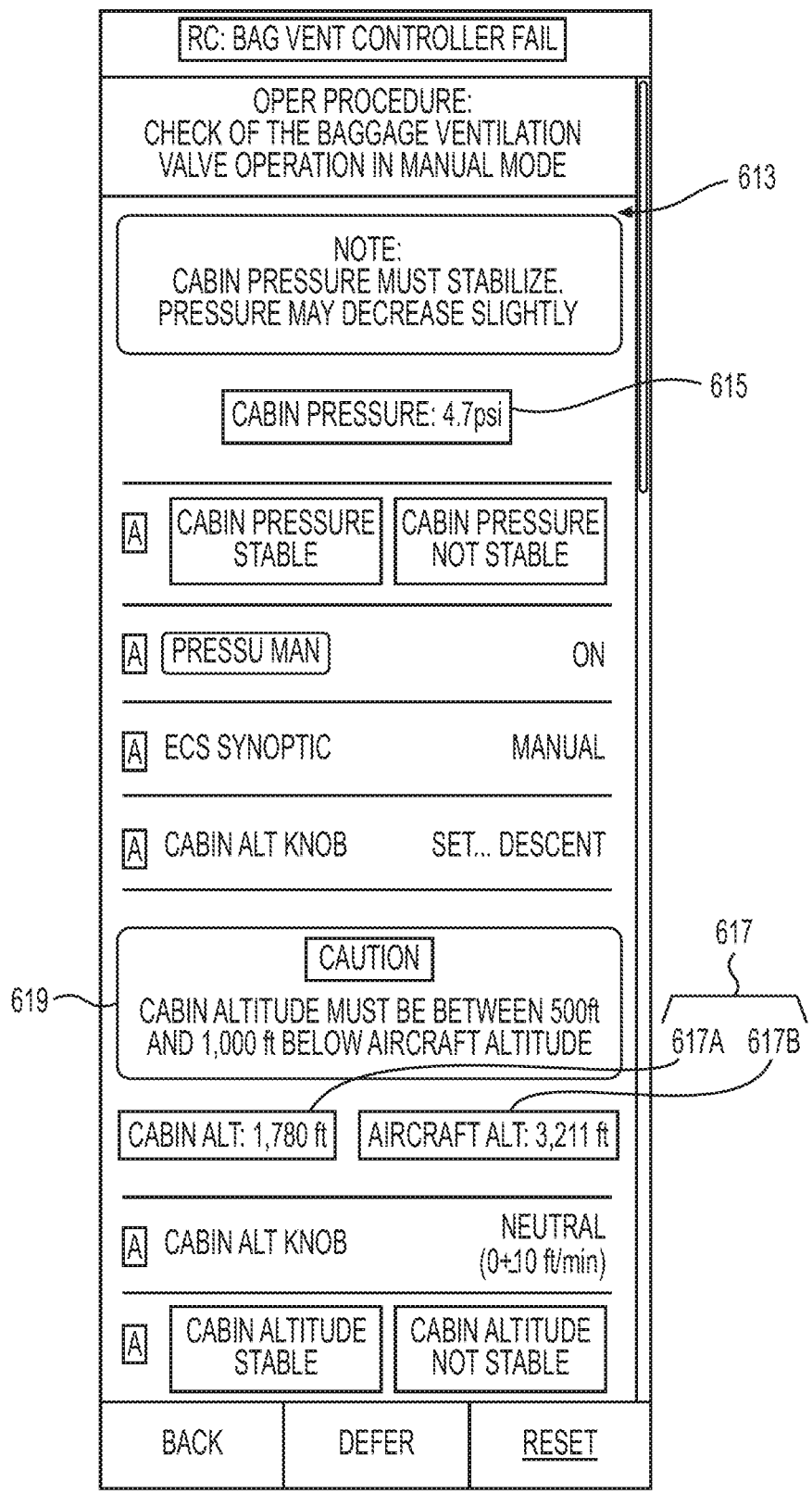
Figure 6C:
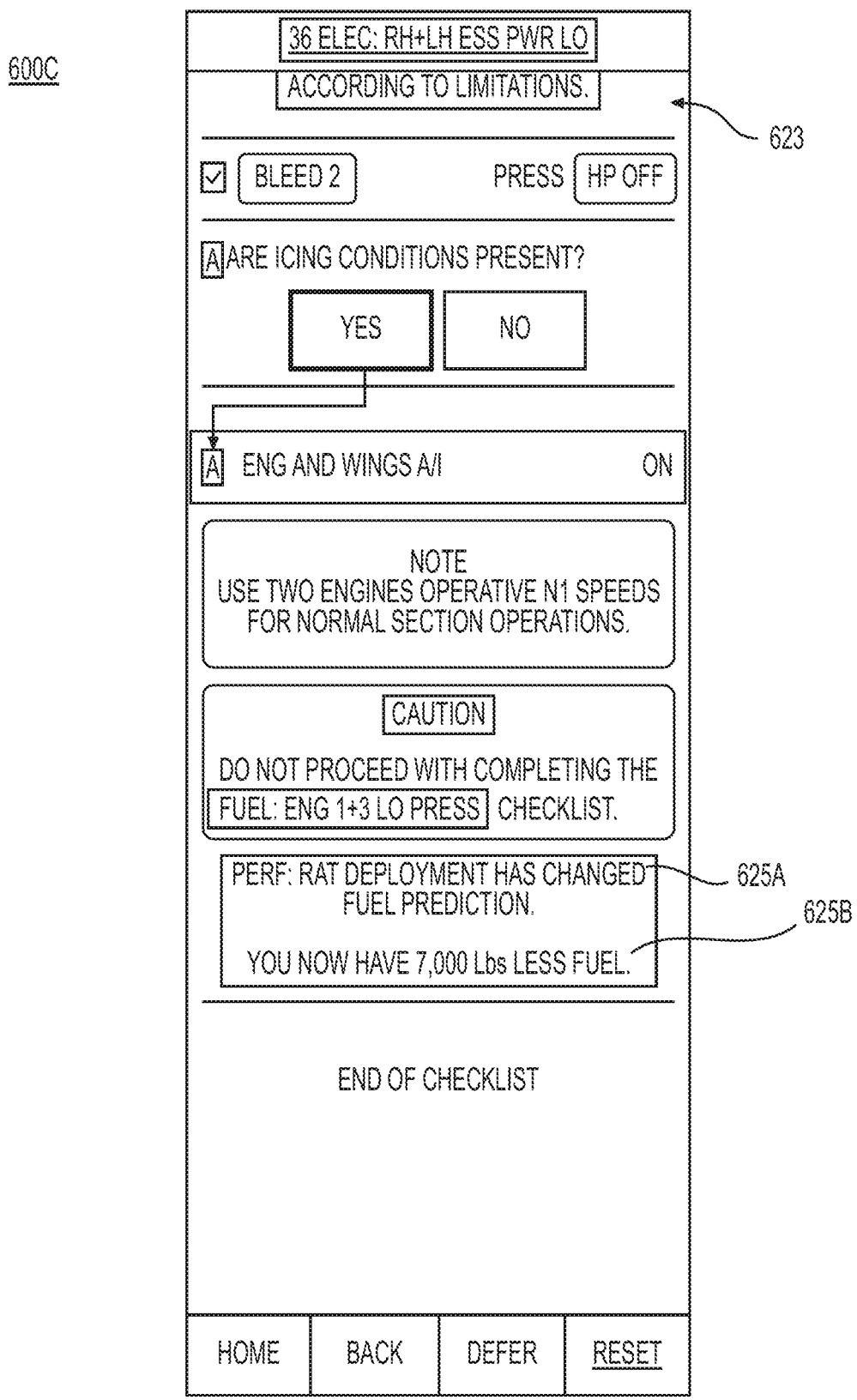
Figure 7A:
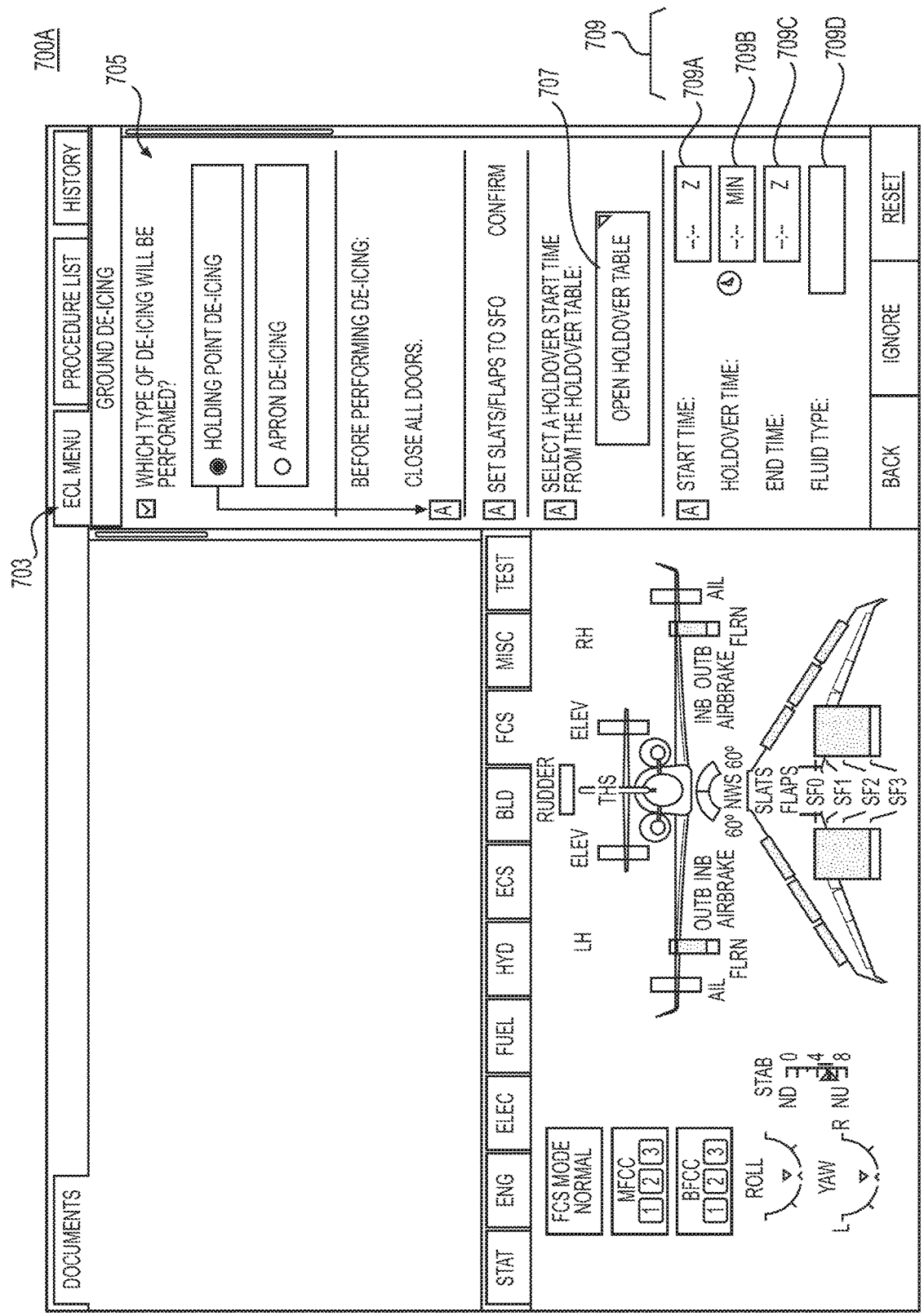
Figure 7C:
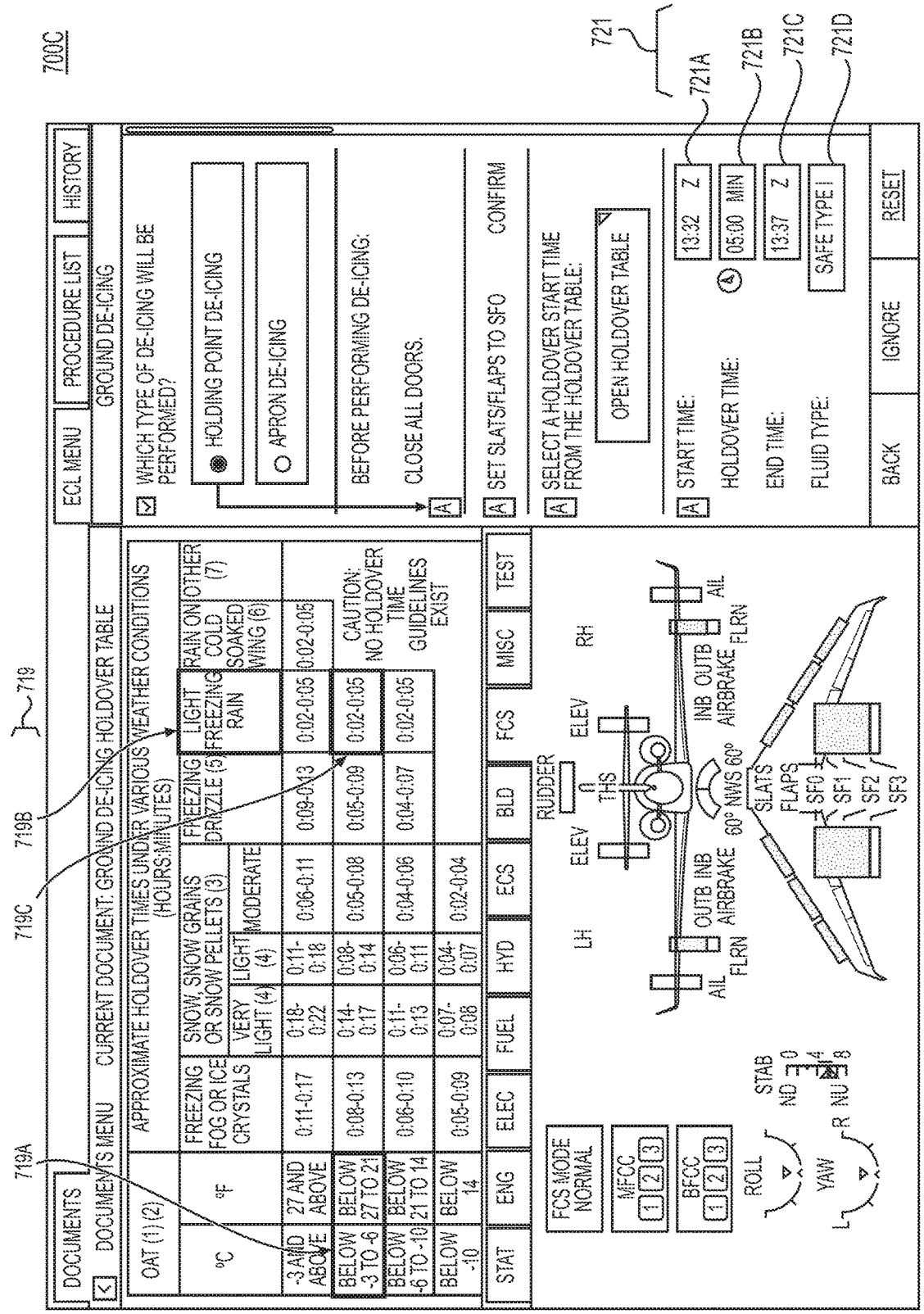

Turning to FIGS. 6A-6C, FIGS. 6A-6C may depict exemplary GUIs for electronic checklist data references, according to one or more embodiments. Specifically, FIGS. 6A-6C may depict different arrangements of display contents and/or invoking associated functions for dynamic data reference process, in accordance with the data reference function of FIG. 4 above.

GUI 600A may depict a GUI with an arrangement a plurality of dynamic data references 605 in associated with a single task of checklist 603. The plurality of dynamic data references 605 may include a first dynamic data reference 605A, a second dynamic data reference 605B, and a third dynamic data reference 605C. Each of the first dynamic data reference 605A, the second dynamic data reference 605B, and the third dynamic data reference 605C may correspond to a different specific aircraft system bit of information that may inform a user, in associated with a task of the checklist 603, of current particular data that may not be included the checklist data structure, but instead may be based on data from outside the checklist. In this manner, a user may be informed of relevant data without having to navigate away from the checklist.

GUI 600B may depict a GUI with an arrangement of a dynamic data reference 615 and instructions 619 combined with a dynamic data references 617 in checklist 613. The instructions 619 may be a part of the display content for the task associated with the dynamic data references 617. The dynamic data reference 617 may include a first dynamic data reference 617A and a second dynamic data reference 617B, which may be controlled by a user in accordance with instruction 619.

GUI 600C may depict a GUI with an arrangement of a dynamic data reference 625B and an associated function 625A in checklist 623. The associated function 625A may be invoked by the data reference function based on, e.g., a trigger condition (such as, in this case, deployment of RAT) and the changes in the particular data may be displayed as the dynamic data reference 625A.

In this manner, the systems of the present disclosure may depict to the user a GUI that includes coupled data references, as disclosed by the GUI 600A; the systems of the present disclosure may depict to the user a GUI that includes a dynamic data reference coupled with user action instruction, as disclosed by the GUI 600B; the systems of the present disclosure may depict to the user a GUI that includes an impact assessment based on user actions and/or data readings to inform the user by invoking an associated function, as depicted in GUI 600C.

Turning to FIGS. 7A-7E, FIGS. 7A-7E may depict exemplary GUIs for electronic checklist data references, according to one or more embodiments. Specifically, FIGS. 7A-7E may depict a static data reference process to select a value to be populated, in accordance with the data reference function of FIG. 4 above.

GUI 700A may depict a checklist 705 in a checklist interface 703. The checklist 705 may include a static data reference 707 that may be used to populate a plurality of static data fields 709 with values for an associated function of the static data reference 707. The plurality of static data fields 709 may include a first static data field 709A, a second static data field 709D, a third static data field 709C, and a fourth static data field 709D, etc. The static data reference 707 and the plurality of static data fields 709 may selectable by a user input/system input to initiate a static data reference process, as discussed above.

GUI 700B may depict, in response to a user input/system input (as discussed above) on the static data reference 707 and/or the plurality of static data fields 709, a viewer 713. The viewer 713 may display title 715 and a data reference 717. In this case, data reference is a chart that includes a plurality of rows 717C intersecting a plurality of columns 717B with values 717A associated with each intersection. Note, however, one of skill in art would recognize that the viewer 713, as discussed above, may depict various documents for a user to select a value to populate the static data field.

GUI 700C may depict a user input sequence 719 to select a value from the static data reference 707 of GUI 700B. For instance, as a first example, a user may select a row 719A and a column 719B (in either order) to indicate a value 719C, each of which may by emphasized; alternatively or additionally, the user may select the value 719C, and the row 719A and column 719B and each of which may be emphasized. The emphasis may be a bolded outline (as depicted), but the emphasis may be done in any general manner, such as highlighting an area of the selected items, dimming background of non-selected items, bolding texting, etc. The emphasis may indicate to the user which row/column/value was selected. In this manner, a user may confirm relationships; in this case, a user may confirm temperature and weather conditions to populate an appropriate value 719C. The data reference function may then populate the value 719C in the plurality of static data fields 709, and update the GUI 700C to display a plurality of populated data fields 721 (A-D, etc.).

GUI 700D may depict a confirmation menu 723. The confirmation menu 723 may be used to confirm that the user is satisfied with the plurality of populated data field 721. The confirmation menu 723 may include cancel element 725A and a confirm element 725B, each selectable by a user input (e.g., touch or click). The cancel element 725A may exit the confirmation menu 723 and not proceed to invoke an association function so that a user may re-select a value 719C to be populated, while the confirm element 725B may proceed to invoke the associated function with the currently populated plurality of populated data fields 721.

GUI 700E may depict the associated function 727 after the associated function 727 had been invoked by the date reference function. In this case, the associated function 727 may be a timer function, but the associated function 727 may, in general, be a logic function that executes logical operators (as defined by the program code of the associated function) on the values passed to the logic function by the data reference function and/or other data from the other systems and sensors 434.

Figure 8:
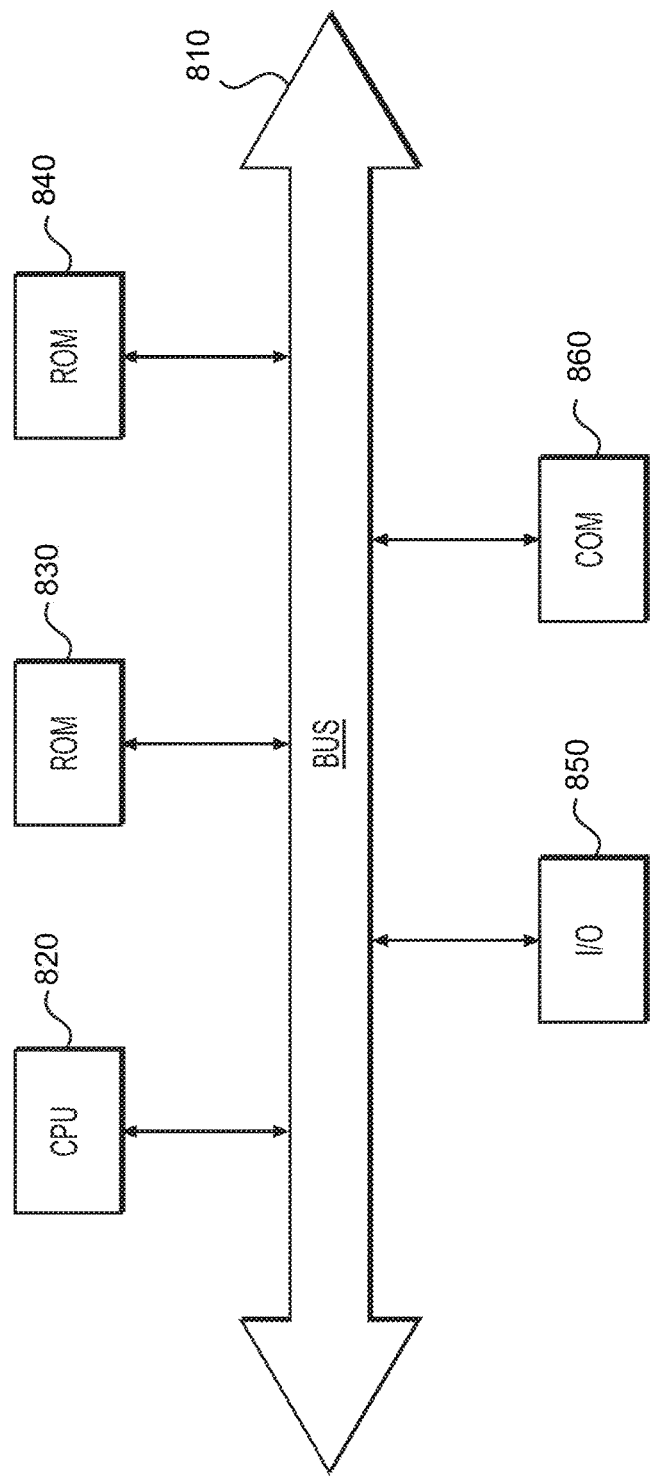
FIG. 8 depicts an example system that may execute techniques presented herein.

FIG. 8 depicts an example system that may execute techniques presented herein. FIG. 8 is a simplified functional block diagram of a computer that may be configured to execute techniques described herein, according to exemplary embodiments of the present disclosure. Specifically, the computer (or "platform" as it may not be a single physical computer infrastructure) may include a data communication interface 860 for packet data communication. The platform may also include a central processing unit ("CPU") 820, in the form of one or more processors, for executing program instructions. The platform may include an internal communication bus 810, and the platform may also include a program storage and/or a data storage for various data files to be processed and/or communicated by the platform such as ROM 830 and RAM 840, although the system 800 may receive programming and data via network communications. The system 800 also may include input and output ports 850 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for electronic checklist data references, comprising:
    receiving a user and/or system input at a graphical user interface (GUI) for a checklist of an electronic checklist system of one or more vehicle systems;
    displaying, in the GUI, a checklist GUI corresponding to the checklist of the electronic checklist system;
    determining whether the checklist includes one or more dynamic data references and/or one or more static data references, wherein the one or more static data references comprises one or more of: a reference manual; a quick reference card; a pdf file; or a document;
    in response to determining the checklist includes the one or more dynamic data references, performing a dynamic data reference process to display specific data in the checklist GUI for the one or more dynamic data references;
    in response to determining the checklist includes the one or more static data references, displaying one or more static data fields in the checklist GUI for the one or more static data references; and
    performing a static data reference process for the one or more static data fields by, for each static data reference tag:
        in response to a user input/system input selecting a static data field, launching a viewer based on a reference pointer of a corresponding static data reference tag;
        in response to user input(s) on the viewer, populating the static data field with a value; and in response to populating the static data field with the value, invoking an associated function using the value based on a function pointer.

2. The method of claim 1, wherein displaying the checklist GUI corresponding to the checklist of the electronic checklist system includes:

obtaining checklist function(s) and checklist-data structure(s) associated with the checklist from one or more function(s) and one or more data structure(s) of loadable database associated with the electronic checklist system, the checklist function(s) including a data reference function, the data reference function including program code to execute the dynamic data reference process and/or the static data reference process for each dynamic data reference and/or static data reference of the checklist; and generating the checklist GUI based on the checklist function(s) and the checklist-data structure(s).

3. The method of claim 2, wherein determining whether the checklist includes the one or more dynamic data references and/or the one or more static data references includes, by the data reference function:

determining whether a content of the checklist-data structure(s) includes one or more data reference tags;

in response to determining the content of the checklist-data structure(s) includes the one or more data reference tags, for each data reference tag, determining a type of the data reference tag; and in response to determining the type of each data reference tag, determining the checklist includes the one or more dynamic data references and/or the one or more static data references.

4. The method of claim 3, wherein the one or more data reference tags are elements of content for particular checklist tasks, and each data reference tag includes one or more display contents, a type, one or more pointers corresponding to the one or more display contents, and/or fetch data/linked function pointer.

5. The method of claim 4, wherein the one or more pointers are indicators of specific system bits of information or links to specific locations for the specific system bits of information, the specific system bits of information including static references and real-time references.

6. The method of claim 5, wherein, for each dynamic data reference, to perform the dynamic data reference process, the method further includes:

obtaining a pointer and/or a fetch data from a data reference tag;

obtaining particular data based on the pointer;

displaying the particular data in accordance with a display content associated with the data reference tag;

determining whether the fetch data indicates a rate;

in response to determining the fetch data does not indicate a rate, end the dynamic data reference process; and in response to determining the fetch data indicates a rate, obtaining the particular data every set period of time in accordance with the rate.

7. A system for electronic checklist data references, the system comprising:

a memory storing instructions; and a processor executing the instructions to perform a process including:

receiving a user and/or system input at a graphical user interface (GUI) for a checklist of an electronic checklist system of one or more vehicle systems;

displaying, in the GUI, a checklist GUI corresponding to the checklist of the electronic checklist system;

determining whether the checklist includes one or more dynamic data references and/or one or more static data references, wherein the one or more static data references comprises one or more of: a reference manual; a quick reference card; a pdf file; or a document;

in response to determining the checklist includes the one or more dynamic data references, performing a dynamic data reference process to display specific data in the checklist GUI for the one or more dynamic data references;

in response to determining the checklist includes the one or more static data references, displaying one or more static data fields in the checklist GUI for the one or more static data references; and performing a static data reference process for the one or more static data fields by, for each static data reference tag:

in response to a user input/system input selecting a static data field, launching a viewer based on a reference pointer of a corresponding static data reference tag;

in response to user input(s) on the viewer, populating the static data field with a value; and in response to populating the static data field with the value, invoking an associated function using the value based on a function pointer.

8. The system of claim 7, wherein displaying the checklist GUI corresponding to the checklist of the electronic checklist system includes:

obtaining checklist function(s) and checklist-data structure(s) associated with the checklist from one or more function(s) and one or more data structure(s) of loadable database associated with the electronic checklist system, the checklist function(s) including a data reference function, the data reference function including program code to execute the dynamic data reference process and/or the static data reference process for each dynamic data reference and/or static data reference of the checklist; and generating the checklist GUI based on the checklist function(s) and checklist-data structure(s).

9. The system of claim 8, wherein determining whether the checklist includes the one or more dynamic data references and/or the one or more static data references includes, by the data reference function:

determining whether a content of the checklist-data structure(s) includes one or more data reference tags;

in response to determining the content of the checklist-data structure(s) includes the one or more data reference tags, for each data reference tag, determining a type of the data reference tag; and in response to determining the type of each data reference tag, determining the checklist includes the one or more dynamic data references and/or the one or more static data references.

10. The system of claim 9, wherein the one or more data reference tags are elements of content for particular checklist tasks, and each data reference tag includes one or more display contents, a type, one or more pointers corresponding to the one or more display contents, and/or fetch data/linked function pointer.

11. The system of claim 10, wherein the one or more pointers are indicators of specific system bits of information or links to specific locations for the specific system bits of information, the specific system bits of information including static references and real-time references.

12. The system of claim 11, wherein, for each dynamic data reference, to perform the dynamic data reference process, the process further includes:
   obtaining a pointer and/or a fetch data from a data reference tag;
   obtaining particular data based on the pointer;
   displaying the particular data in accordance with a display content associated with the data reference tag;
   determining whether the fetch data indicates a rate;
   in response to determining the fetch data does not indicate a rate, end the dynamic data reference process; and
   in response to determining the fetch data indicates a rate, obtaining the particular data every set period of time in accordance with the rate.

13. A non-transitory computer-readable medium storing instructions that, when executed by a processor, cause the processor to perform a method for electronic checklist data references, the method comprising:
   receiving a user and/or system input at a graphical user interface (GUI) for a checklist of an electronic checklist system of one or more vehicle systems;
   displaying, in the GUI, a checklist GUI corresponding to the checklist of the electronic checklist system;
   determining whether the checklist includes one or more dynamic data references and/or one or more static data references, wherein the one or more static data references comprises one or more of: a reference manual; a quick reference card; a pdf file; or a document;
   in response to determining the checklist includes the one or more dynamic data references, performing a dynamic data reference process to display specific data in the checklist GUI for the one or more dynamic data references by, for each dynamic data reference:
      obtaining particular data based on a pointer;
      displaying the particular data;
      determining whether fetch data indicates a rate;
      in response to determining the fetch data does not indicate a rate, end the dynamic data reference process; and
      in response to determining the fetch data indicates a rate, obtaining the particular data every set period of time in accordance with the rate;
   in response to determining the checklist includes the one or more static data references, displaying one or more static data fields in the checklist GUI for the one or more static data references;
   performing a static data reference process for the one or more static data fields by, for each static data reference tag:
      in response to a user input/system input selecting a static data field, launching a viewer based on a reference pointer of a corresponding static data reference tag;
      in response to user input(s) on the viewer, populating the static data field with a value; and
      in response to populating the static data field with the value, invoking an associated function using the value based on a function pointer.

14. The non-transitory computer-readable medium of claim 13, wherein displaying the checklist GUI corresponding to the checklist of the electronic checklist system includes:
   obtaining checklist function(s) and checklist-data structure(s) associated with the checklist from one or more function(s) and one or more data structure(s) of loadable database associated with the electronic checklist system, the checklist function(s) including a data reference function, the data reference function including program code to execute the dynamic data reference process and/or the static data reference process for each dynamic data reference and/or static data reference of the checklist; and
   generating the checklist GUI based on the checklist function(s) and checklist-data structure(s).

15. The non-transitory computer-readable medium of claim 14, wherein determining whether the checklist includes the one or more dynamic data references and/or the one or more static data references includes, by the data reference function:
   determining whether a content of the checklist-data structure(s) includes one or more data reference tags;
   in response to determining the content of the checklist-data structure(s) includes the one or more data reference tags, for each data reference tag, determining a type of the data reference tag; and
   in response to determining the type of each data reference tag, determining the checklist includes the one or more dynamic data references and/or the one or more static data references.

16. The non-transitory computer-readable medium of claim 15, wherein the one or more data reference tags are elements of content for particular checklist tasks, and
   each data reference tag includes one or more display contents, a type, one or more pointers corresponding to the one or more display contents, and/or fetch data/linked function pointer.

17. The non-transitory computer-readable medium of claim 16, wherein the one or more pointers are indicators of specific system bits of information or links to specific locations for the specific system bits of information, the specific system bits of information including static references and real-time references.

* * * * *